Jan. 2, 1951　　　N. F. ANDREWS ET AL　　　2,536,899
CORN HARVESTER TRACTOR MOUNTING MEANS
Filed Dec. 20, 1946　　　　　　　　　　　　3 Sheets-Sheet 1

INVENTORS
NORMAN F. ANDREWS + JOHN B. HAYES
BY
ATTORNEYS

Jan. 2, 1951     N. F. ANDREWS ET AL     2,536,899
CORN HARVESTER TRACTOR MOUNTING MEANS
Filed Dec. 20, 1946     3 Sheets-Sheet 2
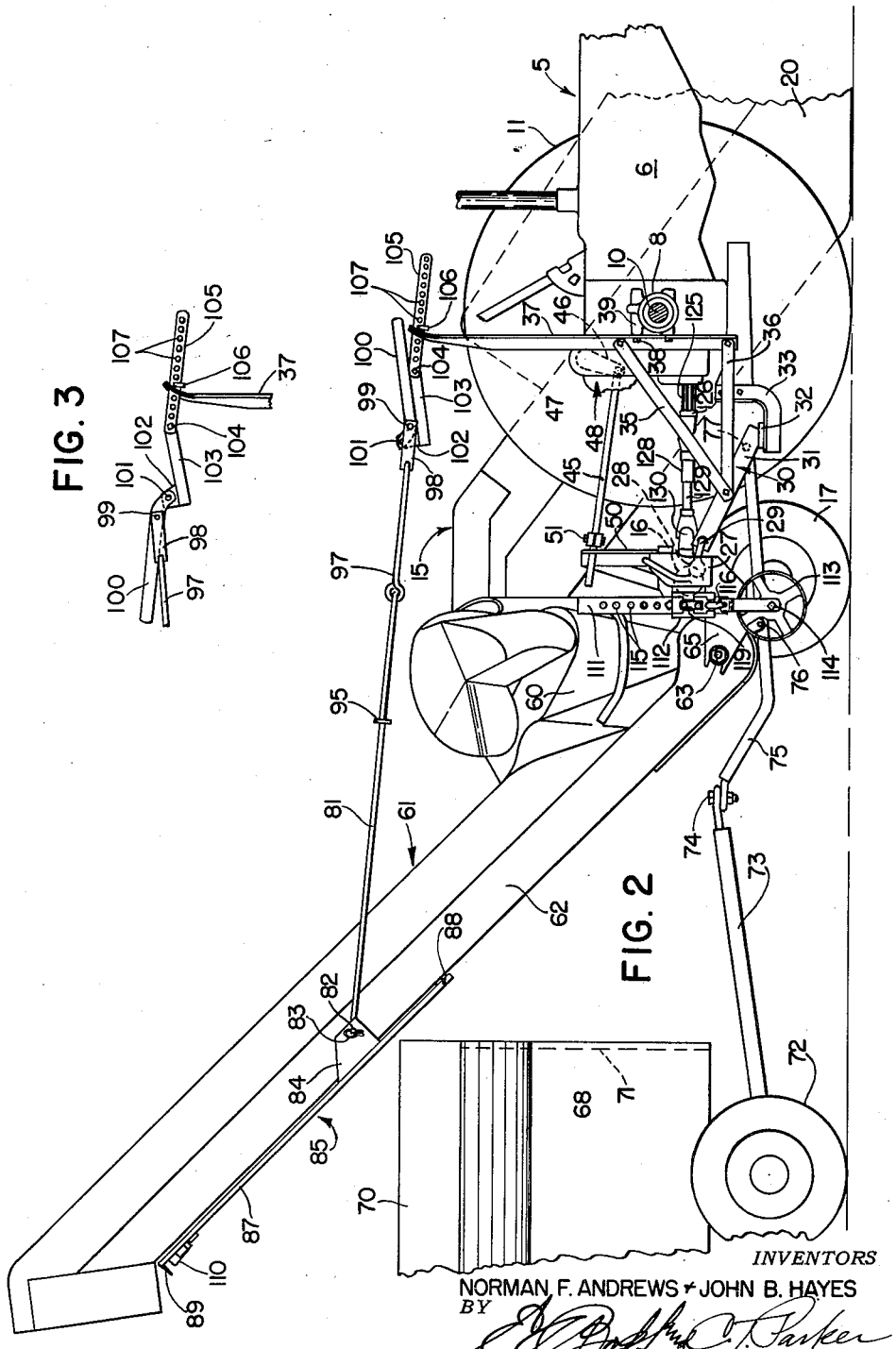
INVENTORS
NORMAN F. ANDREWS + JOHN B. HAYES
BY
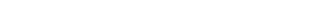
ATTORNEYS

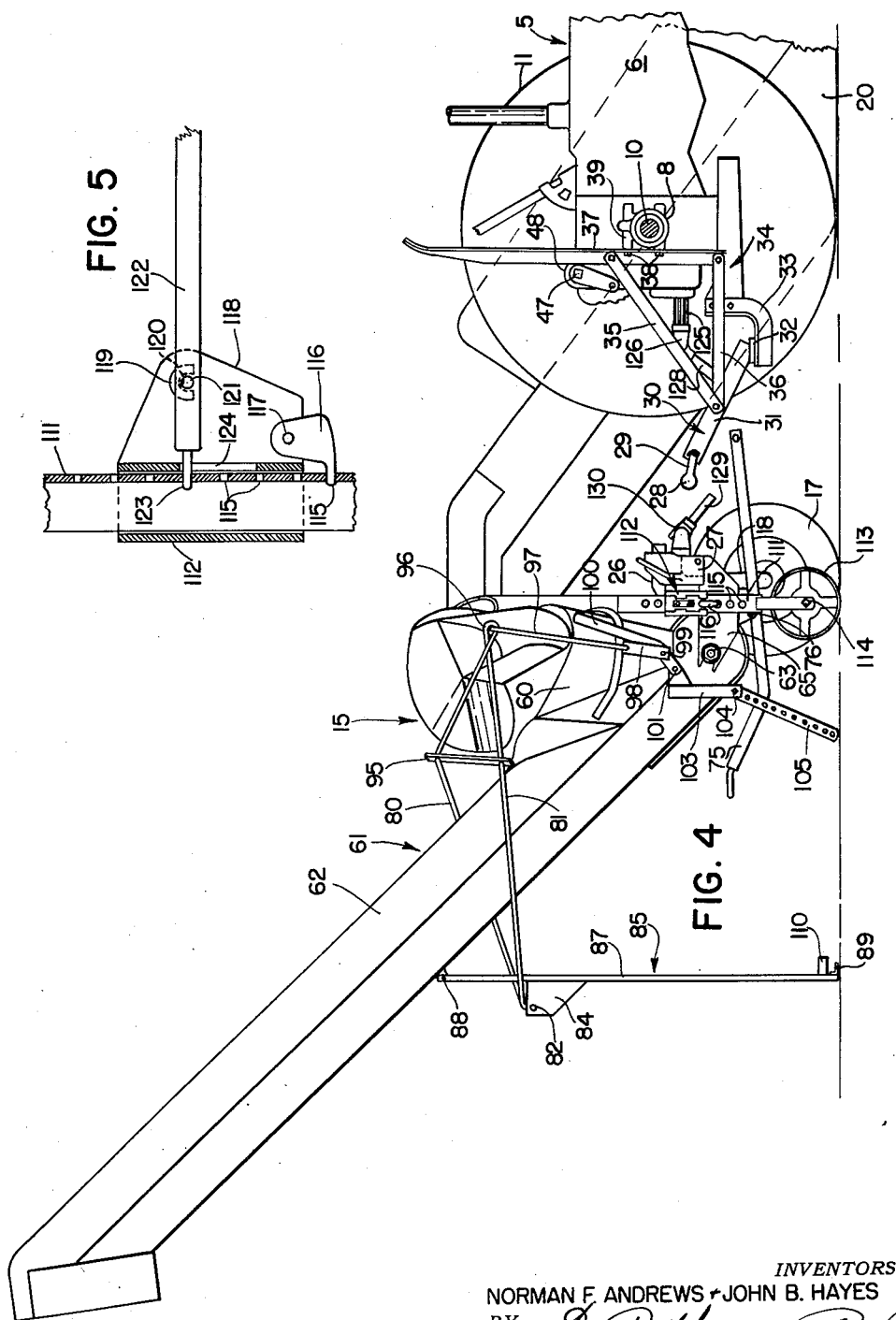

Patented Jan. 2, 1951

2,536,899

UNITED STATES PATENT OFFICE 2,536,899

CORN HARVESTER TRACTOR MOUNTING MEANS

Norman F. Andrews, Moline, and John B. Hayes, Milan, Ill., assignors to Deere & Company, Moline, Ill., a corporation of Illinois Application December 20, 1946, Serial No. 717,514

10 Claims. (Cl. 56—15)

The present invention relates generally to agricultural implements and more particularly to implements of the tractor mounted type, and has for its principal object the provision of novel and improved means for supporting the implement on the tractor and also for supporting the implement on the ground after it has been dismounted from the tractor. It is desirable to provide tractor mounted implements and means for supporting them on the ground after they have been dismounted from the tractor, in such a position that they may be quickly and easily mounted on the tractor after the latter has been moved into a suitable position adjacent the implement, thus facilitating the mounting operation. While the present invention is directed particularly to tractor corn harvesting implements of the type disclosed in Patent No. 2,337,592, granted December 28, 1943, to Coultas and Dort, the principles of this invention are not necessarily limited to this particular implement, for other applications and uses of the principles of the present invention will be apparent to those skilled in the art.

The implement shown in the above mentioned patent comprises a transversely disposed frame, the inner end of which is normally mounted on the rear end of the tractor and the outer end extends laterally beyond the rear tractor wheel at one side of the tractor and has a gatherer unit extending forwardly alongside the tractor wheel. A wagon elevator is pivotally mounted on the frame near the inner end thereof and extends rearwardly in an upwardly and rearwardly inclined position. As disclosed in the patent, when the implement is dismounted it can be supported on a special transport truck provided for holding the inner end of the frame and also for supporting the elevator in normal position to prevent it from dropping to the ground. One of the principal objects of the present invention relates to the provision of a built-in retractable support for the inner end of the frame for holding the latter in a readily attachable position after disconnection from the tractor.

Another object relates to the provision of a supporting means for holding the elevator in upwardly inclined position.

Another object relates to the provision of a supporting device which serves to support the elevator in normal inclined position during operation in the field, the same supporting means also serving to support the elevator on the ground after the implement has been dismounted. Still another object relates to the provision of a supporting means which also serves as a buffer beneath the inclined elevator to prevent damage to the latter by engagement with the edge of a wagon box during operation in the field.

In the accomplishment of these objects, the present invention contemplates the use of a retractable leg, which folds or otherwise shifts from a transport position along the bottom side of the inclined elevator to a downwardly extending ground engaging position when the implement has been dismounted, to hold the elevator in upwardly inclined position.

Still another object relates to the provision of a stirrup attached to the shiftable supporting leg adapted to receive the bottom of the elevator casing for supporting the latter, tension rods being provided for connecting the stirrup to a suitable anchorage on the tractor or implement frame.

These and other objects and advantages of the present invention will be apparent to those skilled in the art after a consideration of the following description, in which reference is had to the drawings appended hereto, in which Figure 1 is a top plan view of a semi-mounted corn harvester shown in operating position on a tractor and delivering the harvested crop into a wagon behind the tractor, portions of the implement, the tractor, and the wagon being broken away to conserve space in the drawing;

Figure 2 is a side elevational view of the implement, tractor and wagon, the rear wheel of the tractor being removed to expose the details of construction;

Figure 3 is a fragmentary elevational view showing the elevator supporting device in a released position;

Figure 4 is a side elevational view of the rear end of the tractor and the implement, showing the latter in a dismounted position behind the tractor; and Figure 5 is a sectional elevational view taken along a line 5—5 in Figure 1 through the jacking mechanism for the retractable frame support and including a jacking lever in actuating position.

Figure 1:
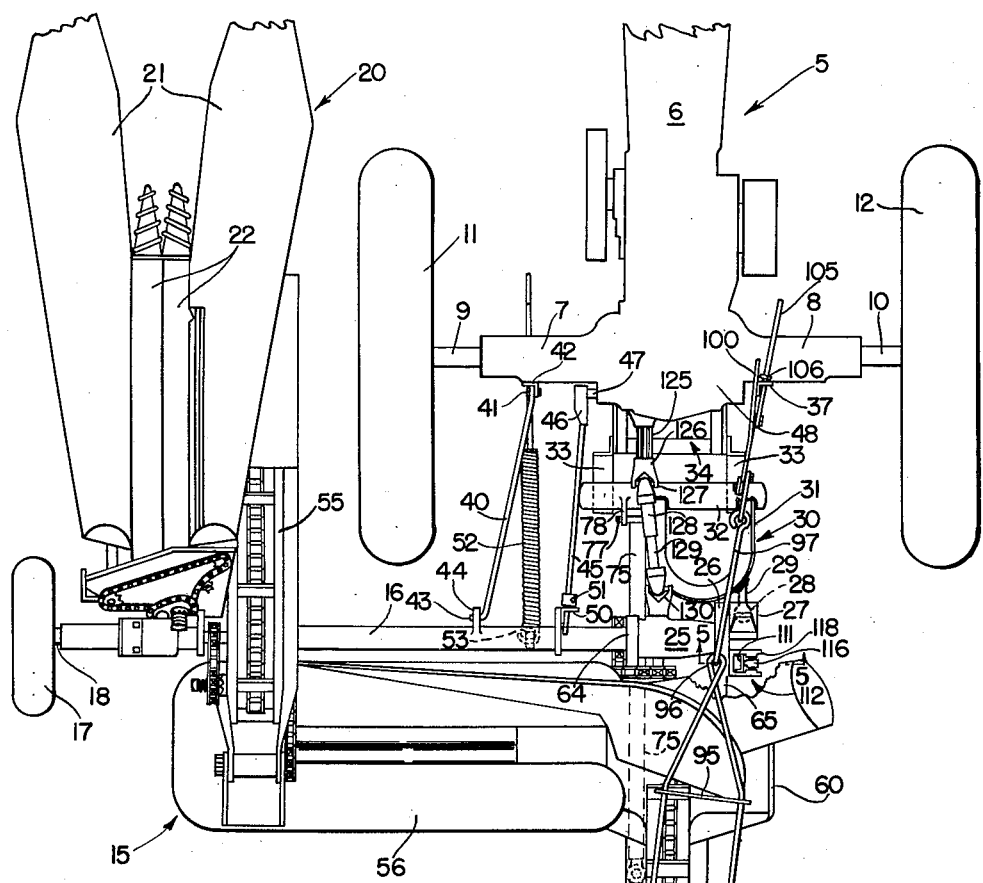

Referring now to the drawings, the tractor is indicated by reference numeral 5 and comprises a narrow longitudinally extending body 6 the front end of which is supported on a conventional dirigible wheeled truck (not shown) and the rear of which is mounted on a pair of oppositely extending rear axle housings 7, 8, within which are journaled axles 9, 10 mounted on traction wheels 11, 12, respectively.

The corn harvester is indicated by reference numeral 15 and comprises a frame including a main transversely disposed tubular beam 16 disposed behind the tractor 5 and having its inner end carried on the tractor by means which will be described later. The beam 16 extends laterally beyond one of the traction wheels 11 and is carried at its outer end on a ground engaging wheel 17 mounted on a depending axle arm 18 attached to the outer end of the beam 16. The outer end of the beam 16 carries a harvesting unit 20 comprising a pair of gatherers 21, extending forwardly from the beam 16 and rigidly fixed thereto and alongside the adjacent tractor wheel 11, and a pair of snapping rolls 22 are mounted between the gatherers 21 in a manner well known to those skilled in the art and shown in detail in the Coultas and Dort patent mentioned above.

The inner end of the tubular beam 16 is fixed to a gear casing 25 which is provided with a bracket 26 at its inner end, the latter rigidly supporting a socket member 27 which is adapted to receive a ball 28 having a neck portion 29 rigidly fixed, as by welding, to a structural support 30. The support 30 comprises a framework including a U-shaped angle member 31 inclined upwardly and rearwardly from a transverse frame member 32, to which the two legs of the U-shaped member 31 are rigidly welded. The transverse member 32 is rigidly mounted on the tractor drawbar frame 34 by means of a pair of legs 33 at opposite ends, respectively, of the transverse member 32. The U-shaped frame member 31 is also connected by a pair of forwardly diverging braces 35, 36 to a vertical standard 37 secured by bolts 38 to the rear side of the tractor axle housing 8, the housing 8 being provided with the usual implement-supporting bosses 39 for receiving the bolts 38.

Thus, it is evident that the ball joint member 28 is rigidly mounted on the rear of the tractor body 6 and supports the socket member 27 which is rigid with the transverse beam 16, thus pivotally carrying the inner end of the latter on the tractor, while the outer end of the beam 16 is carried on the wheel 17. The beam 16 is free to swing vertically about the ball and socket joint 27, 28 as the outer wheel 17 travels over rolling ground. A second draft member 40 in the form of a tension link is pivoted at 41 to a bracket 42 secured to the rear side of the axle housing 7, the bolt 41 being disposed on a transverse axis providing for generally vertical swinging movement of the link 40 thereabout. The rear end of the link 40 is provided with a transversely extending end portion 43 which is pivotally mounted on a lug 44 fixed to the tubular beam 16. The link 40 transmits draft force to the beam 16, while permitting vertical swinging movement about the ball and socket joint 27, 28.

The beam 16 is also rockable about its major axis to swing the gatherers 21 vertically to adjust the clearance of the latter above the ground during operation and also to lower the forward ends of the gatherers to a ground engaging position when the implement is dismounted, as will be explained later. The tubular beam 16 is rocked by means of a link 45 connected to a crank arm 46 secured to the rockshaft 47 of the tractor power control mechanism, indicated in its entirety by reference numeral 48. The rear end of the link 45 extends through an aperture in a vertical frame member 50 which is rigidly fixed to the transverse tubular beam 16. A collar 51 is adjustably fixed on the rearwardly extending link 45 and is adapted to engage the arm 50 when the rockshaft 47 is rocked to swing the crank arm 46 rearwardly, thereby forcing the vertical arm 50 rearwardly to raise the gatherers 21. The gatherers 21, however, are free to float along the ground, and by virtue of the lost motion connection between the collar 51 and the arm 50, when the gatherers are forced upwardly by engagement with a rise in the ground, the position of the power lift arm 46 is not affected, but rather serves to limit the subsequent downward movement of the gatherers 21 to permit the latter from dropping into a ditch or depression in the ground. A counterbalancing spring 52 is connected at its rear end to a lug 53 on the bottom of the tubular beam 16 and extends forwardly to a suitable connection (not shown) beneath the tractor axle housing 7. The counterbalancing spring 52 is stressed in tension to urge the beam 16 in a direction tending to lift the forward ends of the gatherers 21 and thereby relieve a portion of the weight of the latter from the power control arm 46, in a manner well known to those skilled in the art.

During operation in the field, the tractor 5 draws the implement 15 forwardly with the gatherers 21 straddling a row of corn, which is received between the snapping rolls 22, which snap the ears from the stalks and deliver the ears by means of a rearwardly extending ear conveyor 55 to a transversely disposed husking unit 56. The husking unit 56 is mounted on the transverse beam 16 by suitable supports rigidly fixed thereto and is positioned behind the beam 16 to partially counterbalance the weight of the gathering unit 20.

The inner end of the husking unit 56 discharges the husked ears of corn into the hopper 60 of a wagon elevator 61. The elevator 61 comprises a casing 62 swingably mounted on a transversely extending pivot 63 on a pair of laterally spaced brackets 64, 65 carried on the tubular beam 16. The pivot 63 comprises a drive shaft for a sprocket (not shown) over which is trained an elevator chain 66 having longitudinally spaced ear engaging paddles 67, which transport the ears longitudinally of the casing 62 and discharge the same from the rear end of the casing into a wagon 68 disposed behind the tractor. The elevator casing 62 is disposed in an upwardly and rearwardly inclined position having its upper or discharge end disposed over the wagon 68. The wagon 68 comprises a wagon box having a pair of longitudinally extending laterally spaced generally vertical side walls 69, 70, the upper ends of which are inclined outwardly, and a pair of transverse end walls, the forward wall being indicated at 71.

The wagon 68 is provided with a pair of rear supporting wheels (not shown) and a dirigible front wheeled truck 72 having a draft tongue 73. The draft tongue 73 is coupled by means of a vertical pin 74 to a draft bar 75, the intermediate portion of which is pivotally supported on a transverse pivot pin 76 carried on the bracket 64. The forward end of the draft bar 75 is pivotally connected by a transverse pin 77 to a pair of lugs 78 mounted on the transverse frame member 32. Thus, the draft force for drawing the wagon 68 is transmitted directly from the tractor through the draft bar 75 to the wagon tongue 73.

The elevator 61 is supported in upwardly inclined relation during operation by means of a pair of laterally spaced tension members 80, 81 disposed along opposite sides of the elevator casing 62, respectively, and having rear ends turned outwardly at 82 and inserted through suitable apertures 83 in the sides of a U-shaped stirrup 84. The stirrup 84 comprises a plate which passes transversely under the elevator casing 62 and has forwardly bent sides which extend along opposite sides of the casing 62, respectively, to receive the tension rods 80, 81.

The stirrup 84 is rigidly fixed, as by welding, to a supporting leg 85 comprising a pair of laterally spaced rods or rails 86, 87, which are pivotally connected to the bottom of the elevator casing 62 by means of a transverse hinge pin 88, the rods 86, 87 normally underlying the elevator casing 62 in a position extending upwardly from the hinge pin 88. The two rods 86, 87 are rigidly interconnected by the stirrup 84 and by a transverse angle member 89 at the free ends of the rods, thereby uniting the rods 86, 87 into a rigid unitary structure which distributes the lifting force from the tension rods 80, 81 along the upper half of the casing 62 during operation.

The tension rods 80, 81 are interconnected by a spreader bar 95 ahead of the elevator casing and the forward ends of the rods converge to form an eye 96 to which is connected a single link 97 extending forwardly therefrom. The forward end of the link 97 is swingably connected to a link bar 98 which is pivoted at 99 to a lever 100 intermediate the ends thereof. One end of the lever 100 is pivotally connected by a bolt 101 to an ear 102 on a link 103 which is pivoted at 104 to an apertured bar 105, the latter extending through a slot in the upper end of the vertical standard 37. A pin 106 can be inserted into any of the apertures 107 in the apertured bar 105 ahead of the vertical member 37 to adjust the length of the supporting member to hold the elevator 61 at the proper inclination.

With the handle of the lever 100 in a forwardly extending position, as shown in Figure 2, the pivot 99 is disposed in an overcenter relation with respect to the pivots 101, 104, thereby locking the lever in that position. It will be noted that in the operating or transport position of the leg 85, the rails or rods 86, 87 protect the bottom of the elevator casing 62 against damage by contact with the upper edge of the wall 71 when the tractor runs into a ditch or other depression in the ground. Thus, the rails 86, 87 act as buffers as well as forming a cradle support for the upper end of the elevator casing.

The leg rails 86, 87 form a third function in supporting the elevator casing 62 in an upwardly inclined position when the implement is dismounted from the tractor, as best shown in Figure 4. The leg 85 can be swung downwardly to a substantially vertical ground engaging position after the lever 100 is swung to a rearwardly extending position, as shown in Figure 3, which has the effect of extending the tension support for the elevator to provide a limited amount of slack in the connection. The leg 85 is provided with a handle 110 extending between the ends of the rails 86, 87 by means of which the operator can pull the leg 85 downwardly into ground engaging position. After the elevator casing 62 is supported on the vertically disposed leg 85, the pin 106 can be withdrawn to permit the bar 105 to slide out of the aperture in the vertical standard 37 and the tension links can then be allowed to hang down, as shown in Figure 4.

The next step in dismounting the implement is to jack the inner end of the implement frame upon a supporting leg 111 comprising a vertically disposed structural channel member slidable vertically in a U-shaped bracket 112 fixed to the end bracket 26. A ground engageable wheel 113 is journaled on a bolt 114 on the lower end of the leg 111. The leg is provided with a series of vertically spaced apertures 115, which are selectively engageable by a latch pin 116 pivotally mounted on a pivot bolt 117 extending between a pair of side walls 118 on the bracket 112. The side walls 118 are provided with a pair of inwardly extending opposed lugs 119 which are provided with recesses 120 on their undersides to receive a pair of trunnions 121 extending laterally from a removable jack handle 122 which can be inserted between the side walls 118 to jack the leg 111 downwardly into ground engaging position. The end of the jack handle 122 is provided with a pin 123 which is insertable through a slot 124 in the bracket 112 into one of the openings 115, as indicated in Figure 5, after which the handle 122 can be raised to urge the leg member 111 downwardly after the latch pin 116 has been withdrawn from engagement with its associated aperture 115. The trunnions 121 serve as fulcrums for the jack handle 122 during this operation, and after the leg 111 has been shifted downwardly the distance between the two apertures 115, the latch pin 116 engages the next aperture to hold the implement supported through the jacket 112 and pin 116 on the leg 111. This jacking operation is repeated until the weight of the implement is transferred to the ground wheel 113 from the ball and socket joint 27, 28. The jack handle 122 can then be removed and the implement is supported by means of the latch pin 116.

The power lift arm 46 is then lowered to drop the forward end of the gatherers 21 upon the ground, to serve as a point of support for the implement and the link 45 can then be disconnected from the arm 46 and arm 50. The socket member 27 is then released from the ball 28 and the link 40 is disconnected from the beam 16 and tractor axle housing 7, after which the tractor can be driven forwardly away from the implement 15, which is then resting in dismounted position upon the ground on its two wheels 17, 113 and on the forward end of the gathering unit 20, while the vertically swingable elevator casing 62 is propped upon its leg 85.

Power is transmitted from the tractor engine to drive the various parts of the implement including the snapping rolls 22, the elevator 55, the husking unit 56, and the wagon elevator chain 66, through a power takeoff shaft 125 which projects rearwardly from the tractor body as is well known to those skilled in the art. The power takeoff shaft 125 is splined to receive a suitably splined sleeve 126, which is connected through a universal joint 127 to a hollow shaft of square cross section 128 adapted telescopically to receive a square shaft 129 connected through a second universal joint 130 to a shaft (not shown) extending forwardly from the gear housing 25. When the tractor is driven forwardly away from the implement, the two telescoping shaft sections 128, 129 pull apart to disconnect the implement from the tractor power takeoff shaft 125.

We claim:

1. A harvesting implement adapted to be mounted on and dismounted from a tractor and comprising a frame, mounting means for supporting one end of said frame on the tractor, a ground engaging supporting wheel journaled near another end of said frame, a gatherer unit mounted rigidly on said frame and normally carried in a position clear of the ground during operation but engageable with the ground when the frame is dismounted from the tractor, a first ground engageable supporting leg shiftable vertically relative to said frame and mounted near said mounting means, means for fixing said leg to said frame at various positions of vertical adjustment, a wagon elevator mounted on said frame and inclined upwardly therefrom in a normal operating position with respect to the frame, and a second retractable leg mounted on said elevator and shiftable relative thereto from a raised operating position to a ground engaging position to support said elevator in substantially said normal position when said implement is dismounted and said frame is stably supported on said first supporting leg, said wheel, and said gatherer unit.

2. A corn harvester adapted to be mounted on a tractor and comprising a frame including a beam normally disposed transversely behind the tractor and extending beyond one side of the latter and a gatherer unit extending rigidly forwardly from said beam, mounting means for supporting the inner end of said beam on the tractor, a ground engaging supporting wheel journaled near the outer end of said beam, a vertical leg disposed at said tractor mounted end of the beam, a wheel journaled at the lower end of said leg, a bracket fixed to said frame in which said leg is vertically slidable, means for locking said leg to said bracket in various positions of vertical adjustment, a wagon elevator mounted on said frame and inclined upwardly therefrom in a normal operating position with respect to the frame, and a retractable leg swingably mounted on said elevator by means providing for swinging from a raised operating position to a lowered ground engaging position to support said elevator in substantially said normal position when said harvester is dismounted and said frame is stably supported on the ground on said vertical leg, said supporting wheel, and said gatherer unit.

3. An implement of the class described, comprising a mobile frame, a wagon elevator pivotally mounted thereon by means providing for vertical swinging movement, a ground engageable support for said elevator for supporting the latter when the implement is not in use, means shiftably connecting said support to said elevator providing for movement of said support from a ground engaging position to a raised transport position, and a supporting element connected to said support, so constructed and arranged as to hold said support in said transport position and coincidentally support the elevator itself through said support.

4. An implement of the class described, comprising a mobile frame, a wagon elevator inclined upwardly and outwardly therefrom and pivotally mounted thereon for vertical swinging movement, a supporting leg pivotally mounted on said elevator by means providing for vertical swinging movement relative thereto between a ground engaging support position and a raised transport position alongside the elevator, and a supporting element connected to said leg, so constructed and arranged as to hold said leg in said transport position and coincidentally to support the elevator itself.

5. In an implement having a mobile frame and a wagon elevator inclined upwardly and outwardly therefrom and pivotally mounted thereon for vertical swinging movement, the improvement comprising: a supporting member carried by the elevator for movement between a first position in which it is disposed along the lower side of said elevator in transport position and serving as a buffer to protect the elevator against damage by engagement with a wagon box and a second position in which it extends downwardly from the elevator to engage the ground and support the elevator, a stirrup member attached to said member and extending laterally to receive said elevator, and tension members connected to said stirrup on opposite sides of said elevator, respectively, and extending to a suitable connection with said frame for supporting said elevator in inclined position.

6. In an implement having a mobile frame and a wagon elevator inclined upwardly and outwardly therefrom and pivotally mounted thereon for vertical swinging movement, the improvement comprising: a supporting leg normally disposed along the lower side of said elevator in transport position and serving as a buffer to protect the elevator against damage by engagement with a wagon box, a stirrup member attached to said leg and extending laterally to receive said elevator, and tension members connected to said stirrup on opposite sides of said elevator, respectively, and extending to a suitable connection with said frame for supporting said elevator in inclined position, said leg being shiftable to a lowered ground engaging position for supporting the elevator on the ground when the implement is not in use.

7. In an implement having a mobile frame and a wagon elevator inclined upwardly and outwardly therefrom and pivotally mounted thereon for vertical swinging movement, the improvement comprising: a supporting leg normally disposed along the lower side of said elevator in transport position and serving as a buffer to protect the elevator against damage by engagement with a wagon box, a stirrup member attached to said leg and extending laterally to receive said elevator, tension members connected to said stirrup on opposite sides of said elevator, respectively, and extending to a suitable connection with said frame for supporting said elevator in inclined position, and means pivotally connecting one end of said leg to said elevator for vertical swinging movement of the leg relative to the elevator between said transport position and a lowered ground engaging position for supporting the elevator on the ground when the implement is not in use.

8. The invention set forth in claim 7, including the further provision that said leg comprises a pair of rods pivotally connected at one end to said elevator and rigidly interconnected by said stirrup member.

9. In an implement having a mobile frame and a wagon elevator inclined upwardly and outwardly therefrom and pivotally mounted thereon for vertical swinging movement, the improvement comprising: a supporting member disposed along the lower side of said elevator in transport position and serving as a buffer to protect the elevator against damage by engagement with a wagon box, detachable means for holding said leg in said transport position, and means pivotally connecting one end of said leg to said elevator for vertical swinging movement of the leg relative to the elevator between said transport position and a lowered ground engaging position for supporting the elevator on the ground when the implement is not in use.

10. The invention set forth in claim 9, including the further provision that said leg comprises a pair of rails and means extending beneath said elevator for rigidly interconnecting said rails.

NORMAN F. ANDREWS.
    JOHN B. HAYES.

REFERENCES CITED

The following references are of record in the file of this patent:

UNITED STATES PATENTS

| Number | Name | Date |
| --- | --- | --- |
| 76,967 | Alger | Apr. 21, 1868 |
| 302,153 | Mohr | July 15, 1884 |
| 1,201,019 | Brudevold | Oct. 10, 1916 |
| 1,916,156 | Coultas et al. | June 27, 1933 |
| 2,217,872 | Lindgren et al. | Oct. 15, 1940 |
| 2,264,565 | Coultas et al. | Dec. 2, 1941 |
| 2,337,592 | Coultas et al. | Dec. 28, 1943 |